(No Model.) 2 Sheets—Sheet 1.
F. R. PACKHAM.
FURROW OPENER FOR SEEDING MACHINES.
No. 557,868. Patented Apr. 7, 1896.
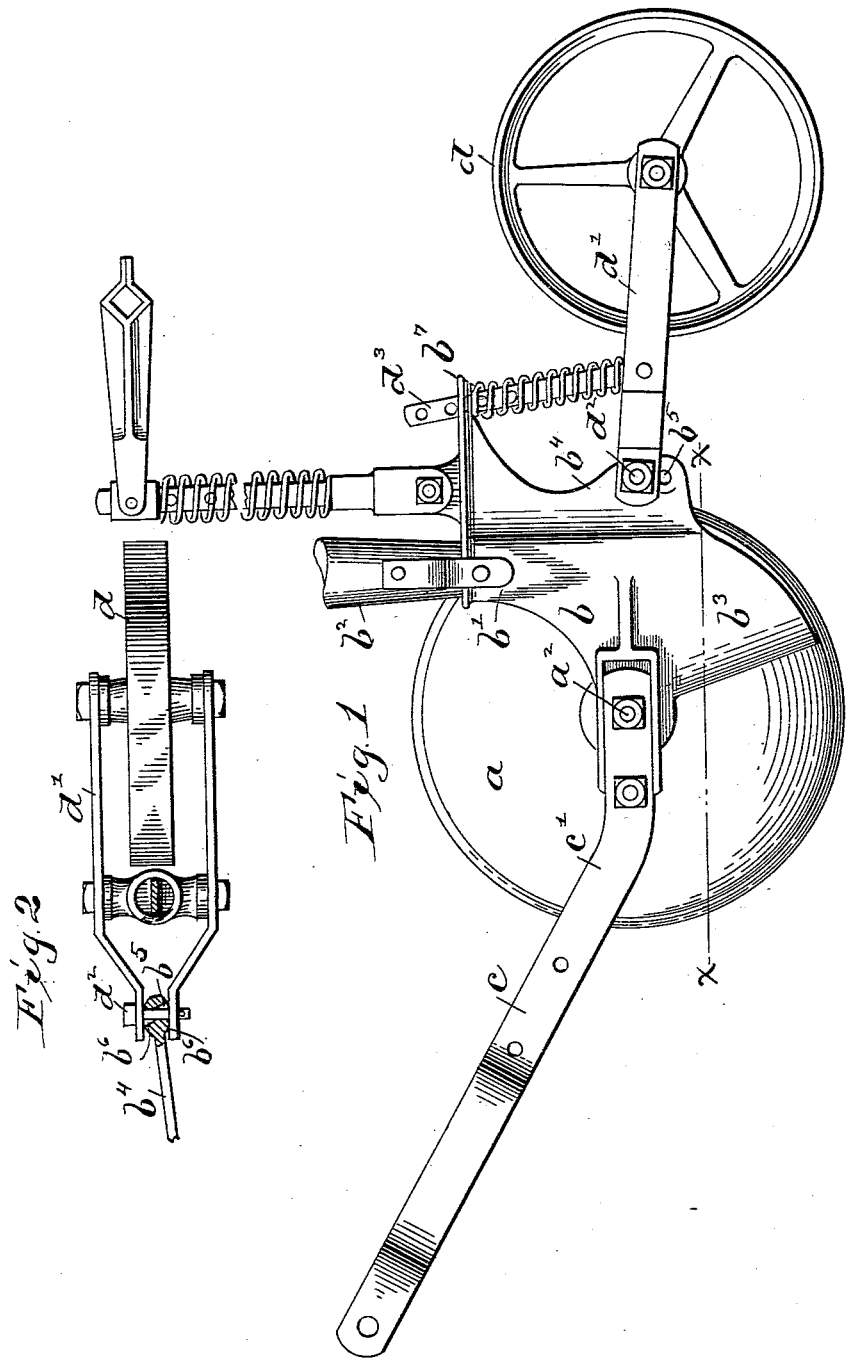
Witnesses
G. M. Gridley
Chas. I. Welch
Inventor
Frank R. Packham
By his Attorney (No Model.) 2 Sheets—Sheet 2.
F. R. PACKHAM.
FURROW OPENER FOR SEEDING MACHINES.

No. 557,868. Patented Apr. 7, 1896.

Witnesses
J. M. Gridley
Chas. J. Welch

Inventor
Frank R. Packham
By his Attorney

UNITED STATES PATENT OFFICE.

FRANK R. PACKHAM, OF SPRINGFIELD, OHIO, ASSIGNOR TO THE SUPERIOR DRILL COMPANY, OF SAME PLACE.

FURROW-OPENER FOR SEEDING-MACHINES.

SPECIFICATION forming part of Letters Patent No. 557,868, dated April 7, 1896.

Application filed July 5, 1895. Serial No. 555,022. (No model.)

*To all whom it may concern:*

Be it known that I, FRANK R. PACKHAM, a citizen of the United States, residing at Springfield, in the county of Clark and State of Ohio, have invented certain new and useful Improvements in Furrow-Openers for Seeding-Machines, of which the following is a specification.

My invention relates to improvements in furrow-openers for seeding-machines, and it especially relates to improvements on the devices shown and described in my prior patent, No. 527,621, issued October 16, 1894.

My invention consists in the various constructions and combinations of parts hereinafter described, and pointed out in the claims.

Figure 3:
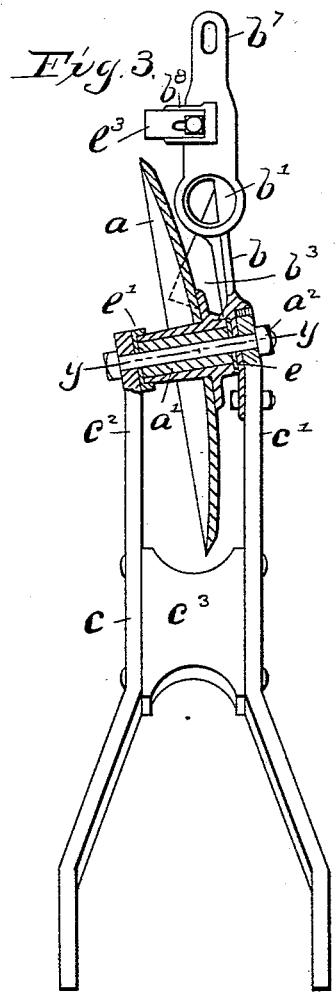
Figure 4:
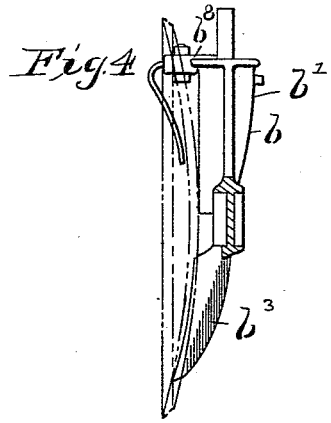
Figure 5:
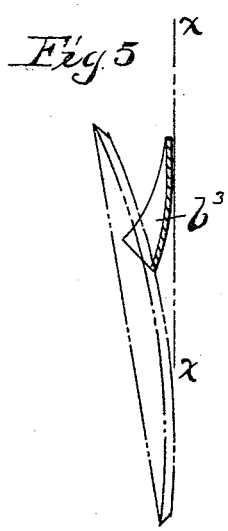

In the accompanying drawings, Figure 1 is a side elevation of a device embodying my invention. Fig. 2 is a plan view, partly in section, of a portion of the same. Fig. 3 is a plan view of the same with the disk and its trunnion in section. Figs. 4 and 5 are detail views hereinafter referred to.

Like parts are represented by similar letters of reference in the several views.

In the said drawings, $a$ represents a furrow-opening disk, which is journaled on a single bearing, preferably in the nature of a sleeve $a'$, secured to the frame or support $b$ by means of a bolt $a^2$, which passes through said sleeve and frame. The disk $a$ and the frame $b$ are connected to the ends of a bifurcated drag-bar $c$ by the bolt $a^2$, which extends through the rear ends of the respective parts $c'$ $c^2$ of said drag-bar, said parts being further connected together by a spacing-block $c^3$. The disk $a$ stands in a plane at an angle to the line of draft, the main body of the frame $b$ being extended to the rear of the trunnion $a'$ and formed with an angularly-arranged conduit $b'$, which extends through said frame substantially parallel to the disk $a$, the seed from the distributers being adapted to be discharged into said conduit through a suitable connecting-tube $b^2$, which extends into said conduit substantially in the manner described in my former patent referred to.

I have discovered in practice that the seeds which are distributed through said conduit are frequently diverted from the furrow after they leave the lower end of the conduit by means of the stubble which would be bent down by the passage of the disk or the supporting-frame therefor, and when released would fly back and strike the dropping grain, and thus distribute it over a larger territory than was intended. To overcome this and to further provide a shield to prevent the land side of the furrow from caving in until the grain has been deposited therein, I have provided the frame $b$ with an extension $b^3$, which extends downwardly in front of and below the end of the conduit $b'$, following substantially the line of the furrow-opening disk. This shield or extension $b^3$ lies wholly within a line drawn parallel with the drag-bar and passing tangent to the front or furrow-opening edge of the disk, so that under ordinary circumstances it stands wholly within the furrow, as indicated by the line $x$ $x$ in Fig. 5.

The front edge of the extension or shield is preferably curved inwardly slightly, as shown in Fig. 5, so as to hug closely the side of the disk and guide the stubble or any stray clods or other foreign substance, so as to not interfere with the falling grain, which falls into the furrow behind said shield, and is therefore completely protected until properly deposited into the furrow.

It will be understood that the shield forms no part of the furrow-opener, nor is it in fact a part of the conduit. The conduit ends where the shield commences, and as the shield stands within the angle of the furrow-opening disk the soil remains in the condition left by the rotation of the disk, while the seed is dropped from a point above the furrow, thus insuring the most efficient planting.

The covering or press wheel $d$ is connected in the usual way, by means of the hanger $d'$, to a suitable extended lug or flange $b^4$ on the frame or support. This hanger $d'$ is pivoted to this lug or flange $b^4$ by means of a bolt $d^2$, which passes through suitable openings $b^5$ in said flange. In order to provide for turning corners and permitting the press-wheel to trail after the furrow-opener, I construct the flange $b^4$ with rounded sides or faces $b^6$ on each side of the openings $b^5$, and also have said openings tapered or countersunk from the outside inwardly, as shown in Fig. 2, to permit an adjustment of the wheel laterally, so that it will properly trail after the furrow-opener. The opening through the lug $b^7$, which supports the connecting-bar $d^3$, should also be formed to give sufficient play to permit the bar $d^3$ to conform to the lateral adjustment of the hanger $d'$.

To prevent wear from end-thrust of the disk against the supporting-frame, I supply between the sleeve $a'$ and the frame $b$ a hardened-steel washer $e$, which projects outwardly beyond said sleeve, so as to form an end bearing for the disk. This washer is clamped between the end of the sleeve $a'$ and the frame by means of the bolt $a^2$, and is thus held rigidly in its position and prevented from turning. The opposite end of the sleeve is provided with a cap $e'$, to which the drag-bar is connected in the usual manner.

The frame or support $b$ is also preferably provided with a laterally-extending lug $b^8$ in the rear of the disk, to which is connected a scraper $e^3$, which is adapted to pass around the disk in the rear and engage on the inside thereof, so as to remove any soil which may accumulate thereon.

Having thus described my invention, I claim—

1. A furrow-opener consisting essentially of a frame or support having a conduit therein, a disk journaled on a suitable trunnion on said frame or support which is located in front of the conduit, said frame or support being provided with an extended portion which projects below the lower end of the conduit and in front of the same, said extension being formed at the front to conform to the shape of the side of the disk adjacent to which it is adapted to lie, substantially as specified.

2. The combination with the frame having a conduit therein, and a furrow-opening disk journaled at an angle on the frame, of a guide or shield extending below the end of the conduit and in front of the same, said shield being located within the angle of the furrow-opening disk so as to stand wholly within the furrow, substantially as specified.

3. The combination with the supporting-frame having a conduit therein, and a disk journaled on said frame at an angle to the line of draft, as described, of a downwardly-projecting shield in front of and below the conduit, said shield being curved at the front so as to lie adjacent to the disk and being placed wholly within the path of said disk so as to extend within the furrow formed thereby, substantially as specified.

4. The combination with a frame having a conduit and an angularly-journaled disk, a press-wheel journaled on a hanger as described, a backwardly-extending flange or lug having rounded faces or sides and countersunk openings as described, and a pivoted connection from said hanger adapted to pass through said openings with the sides of said hanger adjacent to the rounded sides of said flange, substantially as specified.

5. The combination with a frame formed integral with a conduit therein, and an extended shield below said conduit, a drag-bar connected to said frame, and a sleeve also connected at an angle to said drag-bar and frame, a disk on said sleeve, an interposed washer between said disk and frame, and a clamping-bolt extending through said drag-bar, sleeve, and frame so as to clamp the washer between said sleeve and frame, said washer being extended so as to form a stationary bearing for the disk, substantially as specified.

6. The combination with the frame having a supporting-trunnion, and an angularly-arranged furrow-opening disk thereon, a downwardly-projecting shield in the rear of and below said trunnion, said shield being located between the said disk and a line extending through the cutting edge thereof parallel to the line of draft, a lug or projection on said frame, and a scraper connected to said lug so as to bear on the inside of said disk, substantially as specified.

In testimony whereof I have hereunto set my hand this 1st day of July, A. D. 1895.

FRANK R. PACKHAM.

Witnesses:
   CHAS. I. WELCH,
   GEO. A. BEARD.